US005776406A

United States Patent [19]
Schubert et al.

[11] Patent Number: 5,776,406
[45] Date of Patent: Jul. 7, 1998

[54] MOLDINGS OF POLYURETHANE HOTMELT ADHESIVES

[75] Inventors: Georg Schubert, Moenchengladbach; Michael Krebs, Hilden; Karin Jonscher, Duesseldorf; Roland Heider, Hilden, all of Germany

[73] Assignee: Henkel Dommanditgesellschaft auf Aktien, Duesseldorf, Germany

[21] Appl. No.: 860,400

[22] PCT Filed: Dec. 14, 1995

[86] PCT No.: PCT/EP95/04949

§ 371 Date: Jun. 23, 1997

§ 102(e) Date: Jun. 23, 1997

[87] PCT Pub. No.: WO96/20252

PCT Pub. Date: Jul. 4, 1996

[30] Foreign Application Priority Data

Dec. 23, 1994 [DE] Germany ............................ 44 46 027.9

[51] Int. Cl.⁶ ........................ B29G 45/14; C08G 18/10; C08G 18/42; C08G 18/48
[52] U.S. Cl. ................... 264/328.1; 264/331.19; 528/66; 528/80; 528/83; 528/84; 528/85
[58] Field of Search ............ 264/328.1, 331.19; 528/44, 66, 80, 83, 84, 85

[56] References Cited

U.S. PATENT DOCUMENTS

| 4,957,979 | 9/1990 | Albini et al. ................ 525/420.5 |
| 5,019,638 | 5/1991 | Müller et al. ..................... 528/83 |
| 5,250,607 | 10/1993 | Comert et al. .................... 524/507 |
| 5,455,309 | 10/1995 | Albini et al. .................. 525/420.5 |
| 5,599,895 | 2/1997 | Heider ............................... 528/80 |

FOREIGN PATENT DOCUMENTS

| 0 193 746 | 9/1986 | European Pat. Off. . |
| 354 527 | 2/1990 | European Pat. Off. . |
| 0 611 146 | 8/1994 | European Pat. Off. . |
| 35 41 776 | 5/1987 | Germany . |
| 43 21 044 | 1/1995 | Germany . |
| WO 94/12552 | 6/1994 | WIPO . |

OTHER PUBLICATIONS

"Macromelt Moulding", Henkel KgaA, Mar. 1994.

*Primary Examiner*—Peter A. Szekely
*Attorney, Agent, or Firm*—Ernest G. Szoke; Wayne C. Jaeschke; Martin G. Meder

[57] ABSTRACT

The invention relates to the use of moisture-curing PU hotmelt adhesives as molding compounds for the production of moldings, the PU hotmelt adhesives having a melt viscosity of less than 100 Pa·s at the processing temperature of 70° to 190° C. To produce the moldings, the molding compound is melted at temperatures of 70° to 200° C., the melt is injected into closed molds under an excess pressure of 1 to 50 bar, the cooled moldings are removed from the mold after a short time and are then cured with atmospheric moisture. Economic and technical advantages include distinctly lower processing pressures, expense on machinery and tooling and firm adhesion to various substrates. The moldings are heat-resistant and adhere to various substrates. They are particularly suitable for the production of electrical components.

25 Claims, No Drawings

MOLDINGS OF POLYURETHANE HOTMELT ADHESIVES

BACKGROUND OF THE INVENTION

This invention relates to the use of moisture-curing PU hotmelt adhesives for the production of moldings.

Moldings of hotmelt adhesives are known. Thus, EP 0 193 746 describes a process for the production of moldings, bonds and coatings from melts of thermoplastic poly(amide-urethane) block copolymers which have been obtained by reaction of a) substantially linear, carboxyl- and/or amine-terminated polyamides based on dimerized fatty acids and aliphatic or cycloaliphatic diamines with b) substantially linear, isocyanate-terminated aliphatic polyethers and/or reaction products thereof with 2,3-epoxypropanol, the block polymers containing no free isocyanate or epoxide groups. More specific examples of moldings of these thermoplastic poly(amide-urethane) block copolymers are described in DE 43 21 044. This earlier, but hitherto unpublished patent application relates to cable harnesses with holding elements in the form of injection moldings surrounding at least the outer circumference of the cable group at the fixing points. The injection moldings may assume the form of, for example, feed-through or insertion bushes. The hotmelt adhesive used should preferably crosslink, more particularly with atmospheric moisture. In addition, it should be rubbery, flame-resistant and partly crystalline. The moldings are produced by a) placing the cable group with the zones to be fixed in an injection mold, b) closing the mold, c) injecting the molten molding compound into the mold up to a pressure of 0 to 30 bar and, more particularly, 5 to 30 bar and best keeping it under that pressure for a certain time, d) waiting until the molding compound has solidified through cooling, e) opening the mold and f) removing the molding.

Moldings of the hotmelt adhesive "Macromelt" are described in the technical information pamphlet entitled "Macromelt Moulding" published by Henkel KGaA in Mar., 1994. The process described therein is suitable for the encapsulation of plastic inserts by injection molding. By virtue of the high adhesion of Macromelt, extremely effective sealing and strength values are obtained with the encapsulated molding. On account of the relatively low viscosity of the hotmelt adhesive "Macromelt", it can be pumped under low pressure into the injection mold where even intricate moldings are gently enveloped and thus sealed and protected. Macromelt shows very good adhesion to polar plastic surfaces (for example PVC, PA 6.6, PUR) and to non-polar plastic surfaces (for example PP). To produce the moldings, the Macromelt is converted into a low-viscosity melt solely by application of heat. The melt is pumped into a cold mold in which the heat is removed again. This process normally lasts only a few seconds, depending on the melt (the amount of heat). The molding can then be removed from the mold. Processing takes place in special processing machines which automatically and thus safely control the flow of material from melting up to the mold. The pamphlet does not provide exact details showing that the thermoplastic molding material is based on a hotmelt. However, products based on polyamides are commercially available.

U.S. Pat. No. 5,250,607 describes a moisture-curing extrudable thermoplastic sealing compound consisting essentially of two components, namely:

a) a prepolymer containing around two terminal isocyanate groups per molecule which react with one another in the presence of ambient moisture and b) a flexible PVC.

By virtue of its elastic properties, this sealing compound is suitable inter alia for the encapsulation of electrical connectors. In addition, films, tapes or tubes can be extruded from this polymer blend.

The problem addressed by the present invention was to provide molding compounds and a suitable molding process which would be distinguished not only by good processing properties, such as rapid demoldability, but also by favorable performance properties, such as heat resistance, resistance to chemicals, low porosity and firm adhesion to cable insulations, more particularly based on PVC.

BRIEF DESCRIPTION OF THE SEVERAL VIEWS OF THE DRAWING

Not applicable

DETAILED DESCRIPTION OF THE INVENTION

The solution to this problem as provided by the invention is defined in the claims. It is essentially characterized in that moisture-curing polyurethane hotmelt adhesives with a melt viscosity of less than 100 Pa·s at their processing temperature are used as molding compounds for the production of moldings. The melt viscosity of the hotmelt adhesives is preferably below 50 Pa·s and, more preferably, below 20 Pa·s.

In the context of the present invention, a "moisture-curing polyurethane hotmelt adhesive" is understood to be a substantially solventless adhesive containing urethane groups which is solid at room temperature and which, after application in the form of a melt, sets physically not only by cooling, but also by chemical reaction of isocyanate groups still present with moisture. It is only after this chemical curing process, which results in enlargement of the molecule, that the adhesive acquires it final properties.

"Moisture-curing" means that the polyurethane hotmelt adhesive contains silane and/or isocyanate groups which enter into a chain-extending reaction with water, more particularly in the form of atmospheric moisture.

The "polyurethane hotmelt adhesives" preferably contain no polyamide blocks, only polyurethane blocks.

The moisture-curing polyurethane hotmelt adhesive contains the following components:

A) at least one polyurethane prepolymer of
  a) at least one polyisocyanate,
  b) at least one polyol and
  c) optionally at least one chain-extending agent in an NCO/OH ratio of 1.1 to 4 and, more particularly, 1.5 to 3 and B) optionally additives, such as
  d) at least one resin or tackifier and
  e) auxiliaries, such as stabilizers, antioxidants, catalysts, siccatives, rheological additives, pigments and fillers and
  f) at least one thermoplastic polymer with a molecular weight of more than 10,000 (number average) and a softening point above 50° C. (ring and ball).

A "polyurethane prepolymer" is understood to be an oligourethane containing isocyanate groups which may be regarded as an intermediate stage leading to the crosslinked polyurethanes. "At least" one polyurethane prepolymer means that the adhesive has at least one maximum in the molecular weight distribution curve. In general, they correspond in number to the number of separately prepared prepolymers from which the polyurethane hotmelt adhesive is obtained in the event of purely physical mixing. For reasons of practicability, therefore, the upper limit to the number of prepolymers is three.

A "polyisocyanate" is understood to be a low molecular weight compound containing two or more isocyanate groups. Diisocyanates and triisocyanates are preferred, although even higher isocyanates may be present in quantities of up to about 30% by weight. However, the greater the percentage content of higher isocyanate, the greater the risk of unwanted crosslinking both during the production and during the use of the hotmelt adhesive. Apart from aliphatic and cycloaliphatic polyisocyanates, aromatic polyisocyanates above all may be used. Specific examples are toluene diisocyanate, diphenylmethane diisocyanate and mixtures thereof. Diphenylmethane diisocyanate in the context of the invention may be both 4,4'-diphenylmethane diisocyanate and 2,4'-diphenylmethane diisocyanate. However, the 2,4'-isomer should preferably make up no more than 50% by weight. One or two different polyisocyanates is/are preferably used. Above all, pure 4,4'-diphenylmethane diisocyanate is used. Its mixture with the 2,4'-isomer influences inter alia the content of unreacted diisocyanate, the thermal stability and the duration of reactivatability of the adhesive film. The percentage content of polyisocyanate in the hotmelt adhesive should be from 5 to 35% by weight and is preferably from 7 to 30% by weight.

The polyols are polyether, polybutadiene and polyester polyols.

A "polyether polyol" is a polyether containing 2 to 4 OH groups, more particularly a linear polyether containing 2 OH groups. It preferably corresponds to the general formula HO(—R—O)$_m$—H, where R is a hydrocarbon radical containing 2 to 4 carbon atoms. Copolymers—both block polymers and statistical copolymers—are also suitable. Specific polyalkylene glycols are polyethylene glycol, polytetramethylene glycol and, above all, polypropylene glycol (R=—CH$_2$—CH(CH$_3$)—). Preferably, only one type of polyalkylene glycol is used. However, mixtures of 2 to 3 polyalkylene glycols differing from one another in their average molecular weight or in the type of their structural units may also be used.

Pure polypropylene glycol is of particular interest. Its average molecular weight should generally be between 250 and 4,500, preferably between 300 and 4,000 and, more preferably, between 400 and 450 (number average molecular weight based on OH measurements).

The polybutadiene polyol is produced, for example, by polymerization of butadiene in the presence of H$_2$O$_2$.

A "polyester polyol" is a polyester containing at least two OH groups and preferably two terminal OH groups. It may be prepared in known manner from
a) hydroxycarboxylic acids and/or from
b) dicarboxylic acids, more particularly those containing 6 to 12 carbon atoms, and diols, more particularly those containing 4 to 8 carbon atoms.

It is of course also possible to use corresponding derivatives, for example lactones, methyl esters or anhydrides. Specific starting products are caprolactone and aliphatic dicarboxylic acids, such as adipic acid, azelaic acid, sebacic acid, decanedioic acid, dodecanedioic acid and cyclohexane dicarboxylic acid, aromatic dicarboxylic acids, such as phthalic acid, terephthalic acid and isophthalic acid, and diols, such as ethylene glycol, butane-1,4-diol, hexane-1,6-diol, diethylene glycol, neopentyl glycol, 1,4-cyclohexane dimethanol or 3-hydroxy-2,2-dimethylpropyl-3-hydroxy-2, 2-dimethyl propanoate. Apart from homopolymers of the above-mentioned structural units, copolyesters of the following structural units or derivatives thereof are of particular importance:

1. adipic acid, isophthalic acid, phthalic acid and butanediol,
2. adipic acid, phthalic acid and hexanediol,
3. adipic acid, isophthalic acid, phthalic acid, ethylene glycol, neopentyl glycol and 3-hydroxy-2, 2dimethylpropyl-3-hydroxy-2,2-dimethyl propanoate and
4. adipic acid, phthalic acid, neopentyl glycol and ethylene glycol.

The copolyester of adipic acid, isophthalic acid, phthalic acid and butanediol is partly crystalline and has a high viscosity. Accordingly, the polyester glycols are liquid or solid at room temperature. When they are solid, they are preferably amorphous. However, they may also be weakly crystalline. A mixture of partly crystalline and amorphous polyesters is preferably used. However, the crystallinity of the polyesters is so lightly pronounced that it is not reflected in clouding in the final hotmelt adhesive. The melting point of the partly crystalline polyesters is in the range from 40° to 130° C. and preferably in the range from 45° to 110° C. The melting point is the temperature at which the crystalline parts of the material melt. It is determined by differential thermoanalysis in the form of the main endothermic peak. A polybutanediol adipate with a molecular weight of around 3,500 and a melting point of around 50° C. is preferably used as the partly crystalline polyester glycol.

The average molecular weight of the polyester glycol (Mn) should be between 500 and 100,000 g/mole and is preferably between 1,500 and 10,000 and, more preferably, between 2,000 and 6,000 g/mole. It is calculated from the OH value. The molecular weight of the polyester glycol has a certain importance. With increasing molecular weight, the viscosity of the hotmelt adhesive is greatly increased; with decreasing molecular weight, the hotmelt adhesive does not become sufficiently solid at room temperature.

The polyester glycols have a glass transition temperature (Tg) of −90° C. to +50° C. and, more particularly, in the range from −80° C. to +50° C. The glass transition temperature is determined by differential scanning calorimetry (DSC) at a heating rate of 10° C./min. in the second run as the middle point of the stage. Particularly suitable polyester glycols are those with a glass transition temperature of around −80° C. to +40° C., a viscosity of around 300 to around 300,000 mPa·s at 130° C. (Brookfield, RVDV II+Thermosel) and a hydroxyl value of around 15 to 60.

The polyurethane hotmelt adhesives produced with the polyester polyols described above are suitable for the production of transparent moldings with a glass temperature above 0° C. (DSC) and a softening point above 40° C. and, more particularly, above 50° C. (ring and ball method). In order to minimize the formation of bubbles and voids in the moldings, their thickness should be as small as possible. i.e. below 5 mm and preferably below 3 mm. If the glass temperature is above 10° C. and, more particularly, above 15° C., the moldings are particularly easy to demold.

Bubble formation is attributable to the CO$_2$ which is formed during the curing process. It can be avoided by fillers, chemical modifications to the polyurethane or by crystalline components.

A process for the production of polyurethanes with reduced bubble formation is described in DE 35 41 776. It is characterized in that, in a two-stage process, a) a polyether and/or polyester containing two hydroxyl groups with a molecular weight (number average) of 500 to 5,000 is/are first reacted with a diisocyanate in a molar ratio of 1:0.7 to 1:1.3 until the free isocyanate content is between 0.4 and 0.8% by weight and b) the reaction is allowed to continue while low molecular weight triol and more polyfunctional isocyanate are added up to a final free isocyanate group content—to be calculated from the ratio of isocyanate a) still present, additional isocyanate and triol—of 1.5 to 3.5% by weight of isocyanate groups, based on the prepolymer obtained.

The disclosure of this document is hereby specifically included as part of the disclosure of the present application.

Partly crystalline PU hotmelt adhesives in particular are used for the production of bubble-free moldings. To this end, crystalline polyester polyols are used in addition to or instead of the liquid, partly crystalline or amorphous polyols mentioned above. The degree of crystallization, as determined by X-ray photography, should be at least 10% and preferably at least 30%. Preferably more than 10%, in particular more than 20% and, more preferably, more than 30% of the crystalline polyester polyols should consist of dihydroxypolyesters corresponding to the following formula:

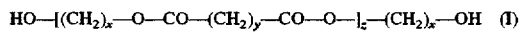

in which x=2 to 18, more particularly 6 to 18,
y=4 to 14, more particularly 8 to 12,
z=4 to 80, more particularly 3 to 50 and
x+Y=10 to 28 and, more particularly, 12 to 26.

Up to 50 mole- % of the alcohol component may be replaced by residues of an etherdiol. Up to 80 mole- % of the carboxylic acid may be replaced by aromatic carboxylic acids, the melting point of these hydroxypolyesters with aromatic carboxylic acid esters having to be below 130° C.

The length of the aliphatic chains is crucial to the crystallinity and hence to the setting properties.

Specific examples of the diols and dicarboxylic acids to be used are dodecanedioic acid and hexane-1,6-diol.

Further examples and also the production of crystalline polyester polyols are described in EP 354 527. The disclosure of this document is hereby specifically included as part of the disclosure of the present application.

Suitable crystalline polyester polyols are obtainable from Hüls AG under the names of Dynacoll 7'XXX, for example 7380 and 7381.

The glass temperature of the moisture-curing crystalline polyurethane hotmelt adhesives, as determined by differential scanning calorimetry, should be below +5° C. and is preferably below −10° C. The maximum of the melting peak, as determined by differential scanning calorimetry, should be above +30° C. and is preferably above 40° C. and below 200° C.

Moldings characterized by very good flexibility and resistance to low temperatures are obtained with these partly crystalline polyurethane hotmelt adhesives. In addition, bubble-free hardening is possible. Adhesion to PVC is excellent. The processing properties of the adhesives are also favorable. The requirements in regard to low tack, demoldability and dimensional stability are satisfactorily fulfilled. The closed molds are very easy to fill without bubbles.

In the context of the invention, "chain extenders" are compounds containing several, more particularly two, functional groups, such as —OH, —SH, —COOH and/or amine, which have a relatively low molecular weight. In the case of aromatic chain extenders, the molecular weight is below 500; in the case of aliphatic chain extenders, it is below 300. In both cases, the molecular weight is preferably below 250 and more preferably below 200. The following compounds are mentioned as examples of chain extenders:

aromatic chain extenders, such as 1,4-bis-(β-hydroxyethoxy)-benzene and ethoxylated and/or propoxylated bisphenol A (=2,2-(4,440-dihydroxydiphenyl)-dimethyl methane, typical saturated and unsaturated glycols, such as ethylene glycol or condensates of ethylene glycol, butane-1,3-diol, butane-1,4-diol, butane-2,3-diol, propane-1,2-diol, propane-1,3-diol, neopentyl glycol, hexane-1,6-diol, bis-hydroxymethyl cyclohexane, dioxyethoxyhydroquinone, terephthalic acid bisglycol ester, succinic acid di-2-hydroxyethylamide, succinic acid di-N-methyl-(2-hydroxyethyl)-amide, 1,4-di-(2-hydroxymethylmercapto)-2,3,5,6-tetrachlorobenzene, 2-methylenepropane-1,3-diol, 2-methylpropane-1,3-diol, thiodiglycol, aliphatic, cycloaliphatic and aromatic diamines, such as ethylenediamine, hexamethylenediamine, 1,4-cyclohexylenediamine, piperazine, N-methylpropylenediamine, diaminodiphenyl sulfone, diaminodiphenyl ether, diaminodiphenyl dimethyl methane, 2,4-diamino-6-phenyl triazine, isophoronediamine, dimer fatty acid diamine, diaminodiphenylmethane or the isomers of phenylenediamine, carbohydrazides or hydrazides of dicarboxylic acids, aminoalcohols, such as ethanolamine, propanolamine, butanolamine, N-methyl ethanolamine, N-methyl isopropanolamine; diethanolamine, triethanolamine and di- or tri-(alkanolamines) and alkoxylation products thereof, aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids, water.

To establish a low predetermined degree of branching, chain extenders of higher functionality, for example trimethylol propane or glycerol, may also be used in small quantities.

In general, the chain extenders are added in quantities of 0.1 to 16% by weight and preferably in quantities of 1 to 8% by weight. At lower concentrations, there is a distinct deterioration in the effect whereas, at higher concentrations, unwanted changes can occur in regard to adhesion and flexibility. Mixtures of chain extenders may of course also be used.

To improve hot tack, resins or tackifiers may also be used in a quantity of 0 to 30 g/100 g of hotmelt adhesive. Specific substances are ketone resins and hydrocarbon resins. Modified aromatic hydrocarbon resins, terpene resins for example α- and β-pinene polymers, low molecular weight polystyrenes, for example poly-α-methyl styrene, colophony esters and coumarone/indene resins are preferred.

By stabilizers are meant additives which are supposed to keep the physical properties, more particularly melt viscosity and color, substantially constant. At least one of the following substances mentioned by way of example may be used for this purpose: phosphoric acid, phosphorous acid and toluene sulfonyl isocyanate.

The curing reaction may be accelerated by addition of known polyurethane catalysts, for example diorganotin compounds, for example dibutyl tin dilaurate, or a mercaptotin compound. The catalysts may be used in quantities of 0 to 1.5% by weight and, more particularly, in quantities of 0.02 to 0.2% by weight, based on the weight of the prepolymer.

However, the hotmelt adhesives according to the invention are preferably solvent-free. Solvent-free compounds are understood to be inert organic compounds with a boiling point of up to 200° C. at normal pressure. In addition, the hotmelt adhesives according to the invention preferably do not contain any inert fillers, for example clays, carbonates and titanium dioxide, but may contain pigments in a quantity of 0 to 15% by weight and preferably in a quantity of 0 to 5% by weight.

Pyrogenic silica is mentioned as a rheological additive. It provides for pseudoplastic flow behavior.

Polyesters, polyethylene/vinyl acetate and polyethylene acrylate are mentioned as thermoplastic polymers. They provide for relatively high initial strength.

However, not only the weight range of the individual components, but also their ratio by weight to one another are important. Thus, the ratio of the reactive groups NCO:OH should be 1.1:1 to 4:1 and, more particularly, 1.15:1 to 3:1. The NCO:OH ratio to be selected for a particular adhesive composition should be selected so that the hotmelt adhesive has a useful molecular weight, i.e. the melt viscosity of the hotmelt adhesive should be below 100 Pa·s, more particularly below 50 Pa·s and above all below 20 Pa·s at the processing temperature. The processing temperature is in the range from 70° to 190° C. In addition, the hotmelt adhesive should still contain at least 0.5 to 3 g and, preferably, 1.0 to 2 g of free NCO groups per 100 g of hotmelt adhesive to ensure adequate curing with moisture. The NCO content is determined by titration.

The polyurethane prepolymer according to the invention may be produced both in a single stage and in several stages.

However, the polyurethane prepolymer according to the invention is preferably produced by a single-stage process. To this end, the polyester and polyalkylene glycols and the chain extender are first mixed and then dried in vacuo for 60 minutes at 110° to 130° C. After the mixture has cooled to around 90° C., the polyisocyanate is then added. The reaction mixture is again heated to 110° to 130° C. In the absence of a catalyst, it generally takes about 60 minutes for the reaction to be substantially completed in a vacuum, i.e. until no more OH groups can be detected or are present in a quantity of at most 2 g/100 g of prepolymer, or until the required viscosity is reached.

If the required additives have not already been added during formation of the polyurethane prepolymer, they should now be added and homogenized.

Since the polyurethane prepolymer contains reactive NCO groups, the polyurethane hotmelt adhesive is sensitive to moisture from the air. Accordingly, it has to be protected against moisture in storage. To this end, it is best stored in a sealed, dry and moisture-proof container of aluminium, tin or composite films.

The moisture-curing polyurethane hotmelt adhesives to be processed do not have any particular shapes.

Moldings are produced from these molding compounds by thermoforming in a thermoforming mold under the effect of mechanical forces at temperatures in a certain range. The molding cycle comprises the following individual steps:

a) The mold is closed after any parts to be joined have been introduced.

b) The melted molding compound is injected into the mold up to a certain pressure and is optionally kept under that pressure.

c) The molding compound is allowed to solidify by cooling.

d) The mold is opened.

e) The injection moldings are removed from the mold.

f) The moldings are cured by moisture.

The use according to the invention is distinguished by various positive features:

It affords the following advantages over injection molding in general and U.S. Pat. No. 5,250,607 in particular: a distinctly lower processing pressure, simpler machines and molds, a lower melting temperature and good adhesion to various coated or encapsulated substrates by bonding and not only by welding between moldings and encapsulated substrates where both materials are the same (for example PVC bush and PVC cable).

The most important advantage over casting with casting resins is the much shorter cycle time because curing does not take place in the mold, but instead during storage of the moldings outside the mold. The following advantages are obtained over the molding process according to Henkel's technical information pamphlet: the replacement of the polyamide hotmelt adhesives by moisture-curing polyurethane hotmelt adhesives provides for a broader field of application by virtue of the better properties of the crosslinked material in regard to strength, rigidity, heat resistance, adhesion to various substrates, electrical properties—because the polyamides are hygroscopic—and the lower processing temperature.

By virtue of the technical and economic advantages, the use according to the invention is suitable for the production of plastic components in general. This is particularly relevant where small numbers are involved in view of the low tool costs. It is of particular advantage to produce moldings by injecting the polyurethane hotmelt adhesive onto inserts, for example cables, wires, filaments, etc. Requirements in this regard—besides clamping of the mold (to relieve tensile stress)—include imperviousness, especially to moisture, and a firm connection between the inserts of various materials and the molding as a whole. The transparent polyurethane hotmelt adhesives are suitable as a cover replacement for filling housings, switches, sensors, etc. This is because there is often a need in cases such as these for transparent "cover material" for transmitting optical signals, for example by LCD (switching states). The moldings produced in accordance with the invention are also suitable as a housing replacement for the encapsulation of various components, for example electronic components and circuits of circuit boards and flexible circuits, by injection molding. Finally, the invention is also suitable for sealing and connecting between connectors and electrical leads and for the production of plug-and-socket connections by direct injection onto cable material (electrical conductors and optical cables).

EXAMPLES

The invention is illustrated by the following Example: Production of a bush with a volume of around 1 $cm^3$ of a polyurethane hotmelt adhesive on a PVC cable First the polyurethane hotmelt adhesive was produced. To this end, 1 mole of polyester diol of hexane-1,6-diol and dodecanedioic acid and terephthalic acid in a molar ratio of 6:4 (hydroxyl value 31) was melted and degassed in vacuo for 15 minutes (residual water content <200 ppm). 2.0 Moles of 4,4-methylenediphenyl diisocyanate were then added and homogenized. The starting materials were fully reacted for 2 hours at 120° C. in the absence of moisture. The Brookfield viscosity of the polyurethane hotmelt adhesive thus produced (Thermosel spindle 27) was 22,000 mpa·s at 150° C. Using this polyurethane hotmelt adhesive, the bush was produced on a PVC cable as follows:

1. The brass mold was opened.
2. The PVC cable was placed in the mold.
3. The mold was closed in pressure-tight manner.
4. The nozzle of the melting unit (manufacturer: Beyer and Otto) is brought up to injection channel of the mold and connected thereto in pressure-tight manner.
5. The polyurethane hotmelt adhesive is injected under the following conditions: processing temperature 150° C., injection pressure 5 bar, holding pressure 5 bar, injection time 2 seconds, holding pressure time 10 seconds.
6. The nozzle of the melting unit is removed from the mold.
7. Heat is removed from the polyurethane hotmelt adhesive through the metal mold so that the hotmelt adhesive was solid after a cooling time of 10 seconds.
8. The mold was opened.
9. The dimensionally stable molding was removed so that another production cycle could be started.
10. Any sprue material present on the molding was removed.
11. The molding was cured with atmospheric moisture at room temperature.

The bush did not contain any bubbles even after storage for 2 weeks at room temperature. It was hard and elastic with a modulus of elasticity of >1000 MPa.

By contrast, a bush according to Example 7c of U.S. Pat. No. 5,250,607 contained bubbles. It was soft and elastic and had a modulus of elasticity of 3.4 MPa.

What is claimed is:

1. In a process comprising a step of molding moisture-curing polyurethane hotmelt adhesives compounds for the production of moldings in a mold, wherein the improvement comprises molding with a polyurethane hotmelt adhesive that has a melt viscosity of less than about 100 Pa·s at the polyurethane hotmelt adhesive's processing temperature.

2. The improved process of claim 1, wherein the polyurethane hotmelt adhesive, according to a differential scanning calorimetry curve, melts above about 40° C. and has a glass transition temperature below about 5° C.

3. The improved process of claim 1, wherein the polyurethane hotmelt adhesive contains a NCO-terminated prepolymer in which at least about 30% by weight of the polyol comprises a dihydroxypolyester corresponding to the following general formula:

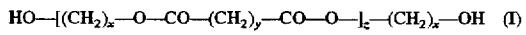

$$HO-[(CH_2)_x-O-CO-(CH_2)_y-CO-O-]_z-(CH_2)_x-OH \quad (I)$$

wherein
x=about 2 to about 18;
y=about 4 to about 14; and
z=about 4 to about 80, wherein up to about 50 mole-% of the diol is replaceable by an etherdiol and up to about 80 mole-% of the aliphatic dicarboxylic acid is replaceable by an aromatic dicarboxylic acid provided that the melting point of the polyester polyol is not above about 130° C.

4. The improved process of claim 1, wherein the polyurethane hotmelt adhesive is transparent.

5. The improved process of claim 1, wherein the polyurethane hotmelt adhesive has a softening temperature above about 50° C. and a glass transition temperature of at least about 5° C.

6. The improved process of claim 1, wherein the processing temperature of the polyurethane hotmelt adhesive is about 70° C. to about 190° C.

7. The improved process of claim 1, further comprising a demolding step.

8. The improved process of claim 7, wherein immediately after demolding, the hotmelt adhesive has a ring and ball softening point of at least about 40° C.

9. The improved process of claim 7, wherein immediately after demolding, the hotmelt adhesive has a ring and ball softening point of at least about 50° C.

10. The improved process of claim 7, wherein immediately after demolding, the hotmelt adhesive has a ring and ball softening point of at least about 60° C.

11. The improved process of claim 7, wherein the polyurethane hotmelt adhesive has a degree of crystallization immediately after demolding of more than about 10%.

12. The improved process of claim 7, wherein the polyurethane hotmelt adhesive has a degree of crystallization immediately after demolding of more than about 30%.

13. The improved process of claim 7, further comprising a moisture curing step.

14. The improved process of claim 13, wherein the hotmelt adhesive has a softening point higher by at least about 20° C. after curing than immediately after demolding.

15. The improved process of claim 13, wherein the moisture curing of the hotmelt adhesive is attributable to groups selected from the group consisting of isocyanate groups, silane groups and mixtures thereof.

16. The improved process of claim 13, wherein the hotmelt adhesive shows relatively poor adhesion to metals before curing.

17. The improved process of claim 13, wherein said closed mold is provided with at least one insert.

18. The improved process of claim 1, wherein said mold is provided with at least one electrical component, whereby said molding step adhesively seals and fills said electrical component.

19. The improved process of claim 18, wherein said electrical component is selected from the group consisting of sensors, circuit boards, switches and combinations thereof.

20. Moldings produced by the improved process of claim 1.

21. An improved process for the production of moldings in a mold according to claim 1, comprising the steps of:

melting a polyurethane hotmelt adhesive molding compound at temperatures of about 70° C. to about 200° C. to form a melt;

injecting the melt into at least one closed mold to form at least one molding under an excess pressure of about 1 to about 50 bar;

cooling said mold for an effective period of time;

removing said at least one molding from said mold; and curing said moldings with moisture.

22. The improved process of claim 21, wherein said closed mold is provided with at least one insert.

23. The improved process of claim 21, wherein said mold is provided with at least one electrical component, whereby said molding step adhesively seals and fills said electrical component.

24. The improved process of claim 23, wherein said electrical component is selected from the group consisting of sensors, circuit boards, switches and combinations thereof.

25. Moldings produced by the process of claim 21.

* * * * *